(12) United States Patent
Gao et al.

(10) Patent No.: US 11,209,591 B2
(45) Date of Patent: Dec. 28, 2021

(54) LOW-LOSS HOLLOW-CORE ANTIRESONANT FIBER

(71) Applicant: Jinan University, Guangzhou (CN)

(72) Inventors: Shoufei Gao, Guangzhou (CN); Yingying Wang, Guangzhou (CN); Yifeng Hong, Guangzhou (CN)

( * ) Notice: Subject to any disclaimer, the term of this patent is extended or adjusted under 35 U.S.C. 154(b) by 0 days.

(21) Appl. No.: 17/246,690

(22) Filed: May 2, 2021

(65) Prior Publication Data

US 2021/0349256 A1 Nov. 11, 2021

(30) Foreign Application Priority Data

May 10, 2020 (CN) .......................... 202010389651.X
May 19, 2020 (CN) .......................... 202010425225.7

(51) Int. Cl.
  *G02B 6/02* (2006.01)
  *G02B 6/032* (2006.01)
(52) U.S. Cl.
  CPC .......... *G02B 6/032* (2013.01); *G02B 6/02328* (2013.01); *C03B 2203/14* (2013.01)
(58) Field of Classification Search
  CPC .. G02B 6/32; G02B 6/02328; C03B 2203/14; C03B 37/02781; C03B 2203/16; A61B 2018/2227
  See application file for complete search history.

(56) References Cited

U.S. PATENT DOCUMENTS

| 10,139,560 | B2 * | 11/2018 | Poletti | G02B 6/02328 |
| 2018/0267235 | A1 * | 9/2018 | Russell | G02B 6/02328 |
| 2021/0311250 | A1 * | 10/2021 | Jasion | G02B 6/032 |

OTHER PUBLICATIONS

Habib et al. "Low-loss hollow-core silica fibers with adjacent nested anti-resonant tubes", Jun. 24, 2015, Optical Society of America (Year: 2015).*

* cited by examiner

*Primary Examiner* — Ellen E Kim
(74) *Attorney, Agent, or Firm* — Bochner IP, PLLC; Andrew D. Bochner

(57) ABSTRACT

Disclosed is an ultralow loss hollow-core antiresonant fiber, which includes an outer layer structure, a hollow-core area and a plurality of closed cavities. The radial section of the inner surface of the outer layer structure is a circle with a first radius. In the circumferential direction of the inner surface of the outer layer structure, the plurality of the closed cavities are spaced from one another and are distributed uniformly and circumferentially. Each closed cavity includes: an outermost wall serving as a first thin wall, and the radial section of the outermost wall is a fan shape or a circle with a second radius. Each closed cavity further includes: second thin walls located in the inner space surrounded by the inner surface of the outermost wall, and the end surfaces of the second thin walls are annular thin-walled structures with thin-walled spacers arranged in the centers.

10 Claims, 9 Drawing Sheets

LOW-LOSS HOLLOW-CORE ANTIRESONANT FIBER

CROSS REFERENCE TO RELATED APPLICATION(S)

This patent application claims the benefit and priority of Chinese Patent Application No. 202010425225.7, filed on May 19, 2020, which claims the benefit and priority of Chinese Patent Application No. 202010389651.X, filed on May 10, 2020, these application all are incorporated by reference herein in its entirety.

TECHNICAL FIELD

The present disclosure belongs to the technical field of optics and laser optoelectronics, and particularly, relates to a low-loss hollow-core antiresonant fiber.

BACKGROUND ART

In 1986, Duguay et al. proposed the theory of antiresonant reflecting optical waveguide (ARROW). Intuitively speaking, the principle of antiresonance is to enhance the reflection of grazing incident light when meeting a thin wall of a cladding, so as to constrain the light in a waveguide core as much as possible. In 2002, Litchinitser et al. first applied the ARROW principle to a hollow-core fiber and proposed a hollow-core antiresonant fiber. In principle, the light with the wavelengths that cannot occur resonance (i.e. antiresonance) can pass. Therefore, people call this type of hollow-core fibers which guide light by the principle of the antiresonant reflecting optical waveguide a hollow-core antiresonant fiber (HC-ARF).

The hollow-core antiresonant fiber has the help of local coherence cancellation in a light field of a cladding area, so the overlap degree of a mode field and different dielectric inter-layers is lower than that of a photonic bandgap fiber, and the theoretical minimum loss may be lower than that of the traditional quartz fiber, which has optimization potential. However, there is still a lack of designs of low-loss hollow-core antiresonant fibers in the prior art.

SUMMARY

With regard to the disadvantages in the prior art, the present disclosure provides a low-loss hollow-core antiresonant fiber.

In the radial direction from the outside to the inside of the fiber, the fiber includes an outer layer structure, a hollow-core area and a plurality of closed cavities, except for the hollow-core area, with the same structure located in the inner space surrounded by the inner surface of the outer layer structure. The radial section of the inner surface of the outer layer structure is a circle with a first radius.

In the circumferential direction of the inner surface of the outer layer structure, the plurality of the closed cavities are spaced from one another and are distributed uniformly and circumferentially.

Each closed cavity includes: an outermost wall serving as a first thin wall, and its radial section is a fan shape or a circle with a second radius.

Each closed cavity further includes: second thin walls located in the inner space surrounded by the inner surface of the outermost wall, and the end surfaces of the second thin walls are annular thin-walled structures with thin-walled spacers arranged in the centers.

Preferably,
when the radial section of the first thin wall is a fan shape with a second radius, the end surfaces of the second thin walls alternatively select concentric and fan-shaped thin-walled structures with outward openings.

Preferably,
when the radial section of the first thin wall is a fan shape with a second radius, the end surfaces of the second thin walls alternatively select nested casings.

Preferably,
when the radial section of the first thin wall is a fan shape with a second radius, the number of the second thin walls is two.

Preferably,
when the radial section of the first thin wall is a fan shape with a second radius, the number of the second thin walls is two, and the end surfaces of the second thin walls alternatively select two annular thin-walled structures that are not in contact with each other.

Preferably,
for any two of the plurality of the closed cavities, the wall thicknesses of the first thin walls of the two closed cavities are not equal.

Preferably,
for any two of the plurality of the closed cavities, the wall thicknesses of the first thin walls of the two closed cavities are equal.

Preferably,
for any two of the plurality of the closed cavities, the wall thicknesses of the second thin walls of the two closed cavities are equal.

Preferably,
the second radius is greater than the radius of the fiber core of the fiber.

Preferably,
the minimal radius of the concentric fan-shaped thin-walled structures is less than the radius of the fiber core of the fiber.

Compared with the prior art, the present disclosure has the following beneficial effects:

1. The present disclosure reduces the transmission loss and suppresses the leakage of light through the above-mentioned innovative fiber structure, so that the fiber of the present disclosure has low transmission loss and even ultra-low transmission loss, for example, the loss is less than 1 dB/km, and even less than 0.1 dB/km, thereby realizing ultra-low loss.

2. The closed cavities of the present disclosure are not in contact with one another, and the overall structure of the fiber is relatively simple.

DETAILED DESCRIPTION OF THE EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Apparently, the described embodiments are part rather than all of the embodiments of the present disclosure. On the basis of the embodiments of the present disclosure, all other embodiments obtained on the of premise of no creative work of those of ordinary skill in the art fall within the scope of protection of the present disclosure.

The following further describes the present disclosure in detail with reference to accompanying drawings:

In one embodiment, the present disclosure discloses a low-loss hollow-core antiresonant fiber:

In the radial direction from the outside to the inside of the fiber, the fiber includes an outer layer structure, and a hollow-core area and a plurality of closed cavities, except for the hollow-core area, with the same structure located in the inner space surrounded by the inner surface of the outer layer structure.

The radial section of the inner surface of the outer layer structure is a circle with a first radius.

In the circumferential direction of the inner surface of the outer layer structure, the plurality of the closed cavities are spaced from one another and are distributed uniformly and circumferentially.

Each closed cavity includes: an outermost wall serving as a first thin wall, and its radial section is a fan shape or a circle with a second radius.

Each closed cavity further includes: second thin walls located in the inner space surrounded by the inner surface of the outermost wall, and the end surfaces of the second thin walls are annular thin-walled structures with thin-walled spacers arranged in the centers.

For the above-mentioned embodiment, its core technical contribution lies in the inner space surrounded by the inner surface of the outer layer structure, specifically, the hollow-core area and the plurality of closed cavities, except for the hollow-core area, with the same structure. It can be understood that the fiber core medium of the hollow-core fiber includes a gas or vacuum, and in some cases, may be a liquid with lower refractive index than that of the medium (for example, silica, soft glass or plastics) adopted by any one of the thin films.

Figure 1:
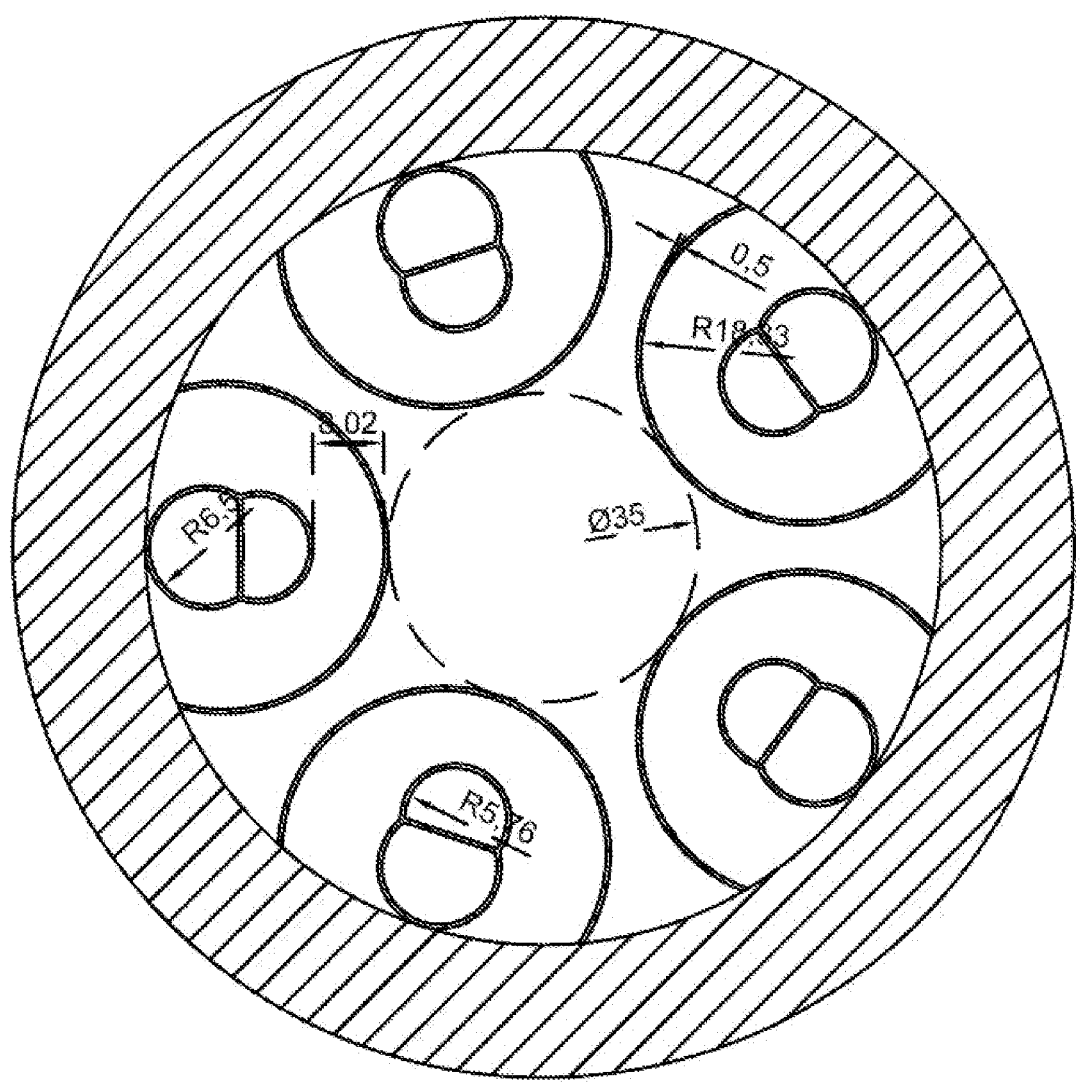
FIG. 1 is a structural diagram of an end surface/radial section of a low-loss hollow-core antiresonant fiber in one embodiment of the present disclosure.

Referring to FIG. 1, the diameter of the fiber core is 35 μm. For any one of the five closed cavities, the outermost layer of the first thin wall has the radial section of a fan shape with a second radius, the numerical value of the second radius is 18.33 μm, and the wall thickness of the first thin wall is 0.5 μm. The end surfaces of the second thin walls are annular thin-walled structures with thin-walled spacers arranged in the centers. The outermost layers of the second thin walls are equivalent to first walls, and the thin-walled spacers are equivalent to second walls. Specifically, for the second thin walls, the radius of part rings close to the inner surface of the outer layer structure is 6.5 μm. The part rings form the second thin walls together through the thin-walled spacers and the part rings which are closer to the fiber core, where the radius of the part rings closer to the fiber core is 5.76 μm. In terms of FIG. 1, the spacing between the first thin wall and the part rings closer to the fiber core is 8.02 μm. It should be noted that, for these parameters of the hollow-core antiresonant fiber, obviously, the parameters, such as the wall thicknesses of related walls and the spacing, need to meet an antiresonance condition. As long as in the parameter range required by the antiresonance reflection, the hollow-core antiresonant fibers, as a type of fibers, can suppress the leakage of light in a coherently canceling manner so as to reduce the loss of the fibers through the antiresonance principle and the structure designs of the fibers.

In terms of FIG. 1 and the above-mentioned embodiments, the second thin walls with a plurality of walls, a plurality of closed cavities that are spaced from one another, and the fiber core medium with lower refractive index than that of any thin wall comprehensively achieve the following technical effects: remarkably reducing the transmission loss and suppressing the leakage of light. It can be understood that the above-mentioned hollow-core antiresonant fiber has the technical effect of low loss due to its structural characteristics.

Figure 2:
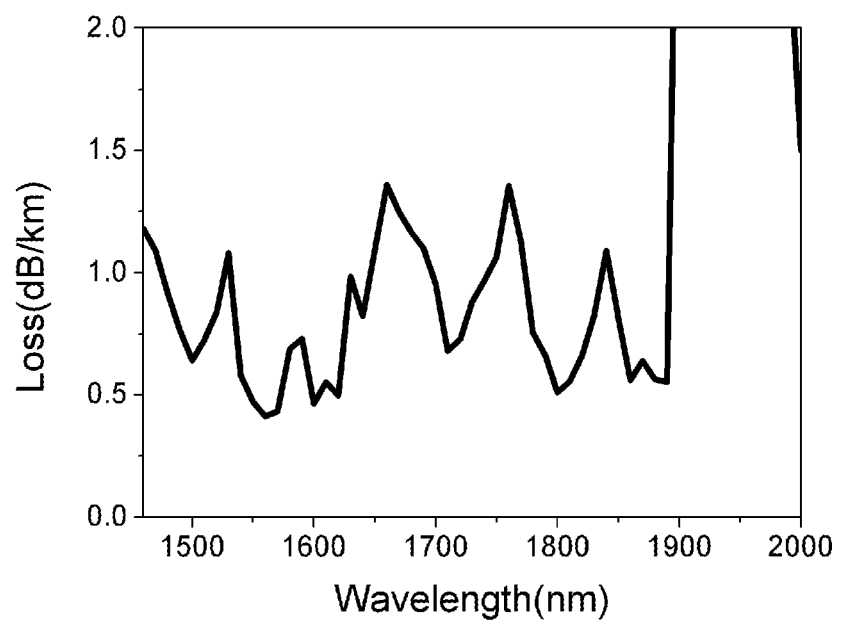
FIG. 2 is a loss curve of a low-loss hollow-core antiresonant fiber in one embodiment of the present disclosure.

Further referring to FIG. 2, it is the performance data of the structure of FIG. 1, at the wavelength of 1560 nm, the loss of the fiber is as low as 0.41 dB/km.

Further, it can be understood that the key of the present disclosure is the plurality of walls and their designs. As for the first thin wall closest to the fiber core, whether its radial section is fan-shaped or circular is not the key, because a symmetrical wall is formed no matter it is fan-shaped or circular. In the case that other structures are unchanged, the difference between the fan shape and the circle is only the specific performance difference of low loss.

Figure 3:
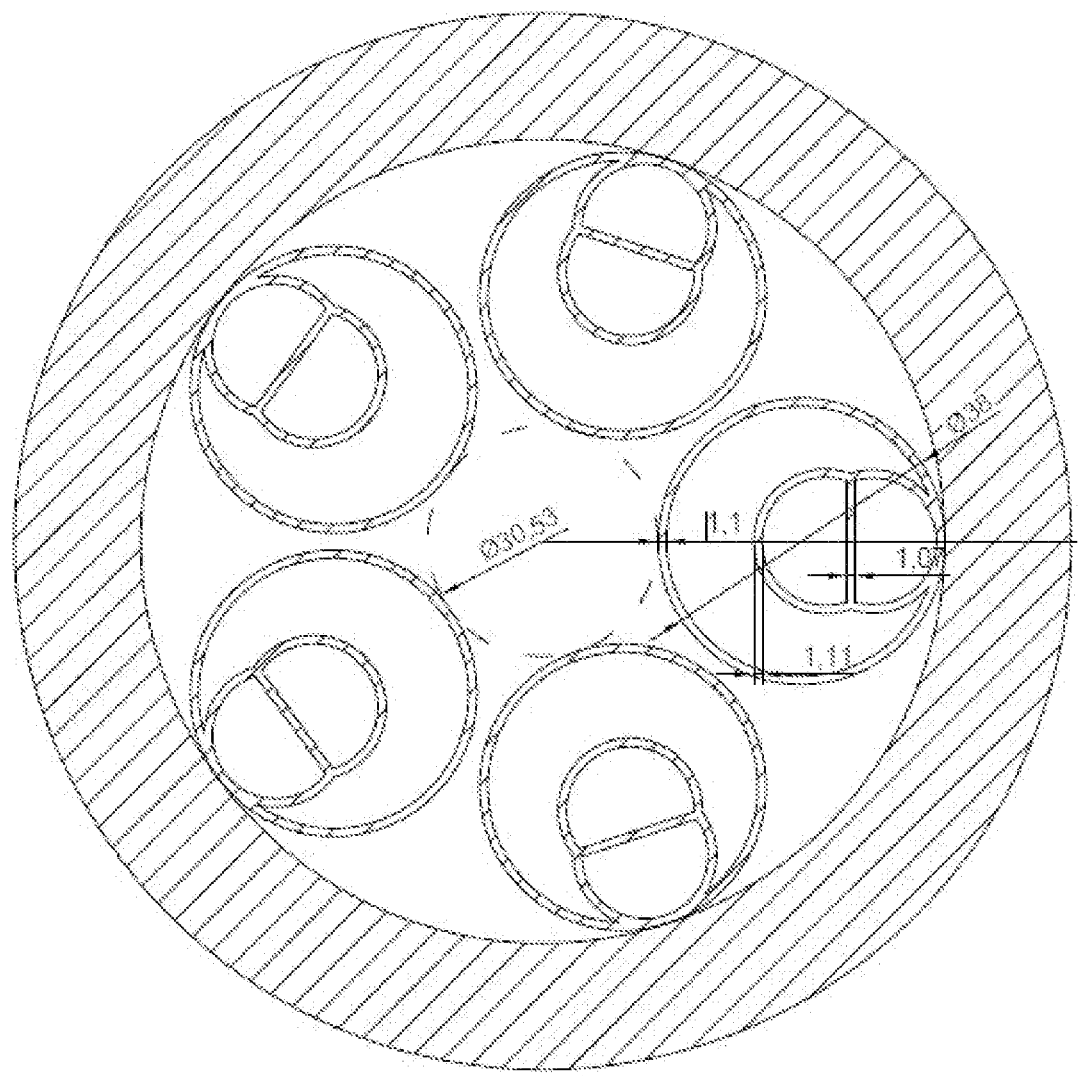
FIG. 3 is a structural diagram of an end surface/radial section of a low-loss hollow-core antiresonant fiber in one embodiment of the present disclosure.
Figure 4:
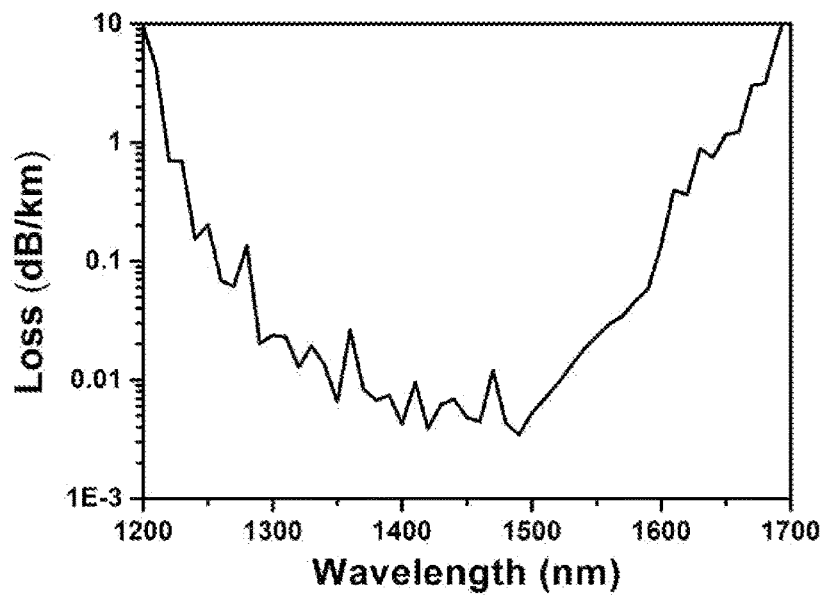
FIG. 4 is a loss curve of a low-loss hollow-core antiresonant fiber in one embodiment of the present disclosure.

Referring to FIG. 3, for any one of the five closed cavities, the radial section of the outermost wall of the first thin wall is a circle with a second radius. When the end surfaces of the second thin walls are annular thin-walled structures with thin-walled spacers arranged in the centers, the outermost layers of the second thin walls are equivalent to first walls, and the thin-walled spacers are equivalent to second walls. By adjusting various parameters, in the wavelength range of 1250 nm to 1600 nm, the fiber as shown in FIG. 3 can realize the loss less than 0.1 dB/km, and the loss curve can refer to FIG. 4. By way of example, in the structure of the fiber as shown in FIG. 3, the diameter of the fiber may be 30.53 μm, the diameter of the first thin wall may be 38 μm, the wall thickness of the first thin wall may be 1.1 μm, the outermost layer of the second thin wall, namely, the wall thickness of the first wall, may be 1.11 μm, and the thin-walled spacer, namely, the wall thickness of the second wall, may be 1.07 μm. In the case that these parameters are fixed, the loss less than 0.1 dB/km is realized by adjusting other parameters.

In addition, there are five closed cavities in FIG. 1. An alternative selection of four closed cavities or other numbers of closed cavities may be considered. In principle, the number is recommended to be greater than or equal to three. Typically, the number of three to eight is selected, more preferably, three to six is selected.

Figure 5:
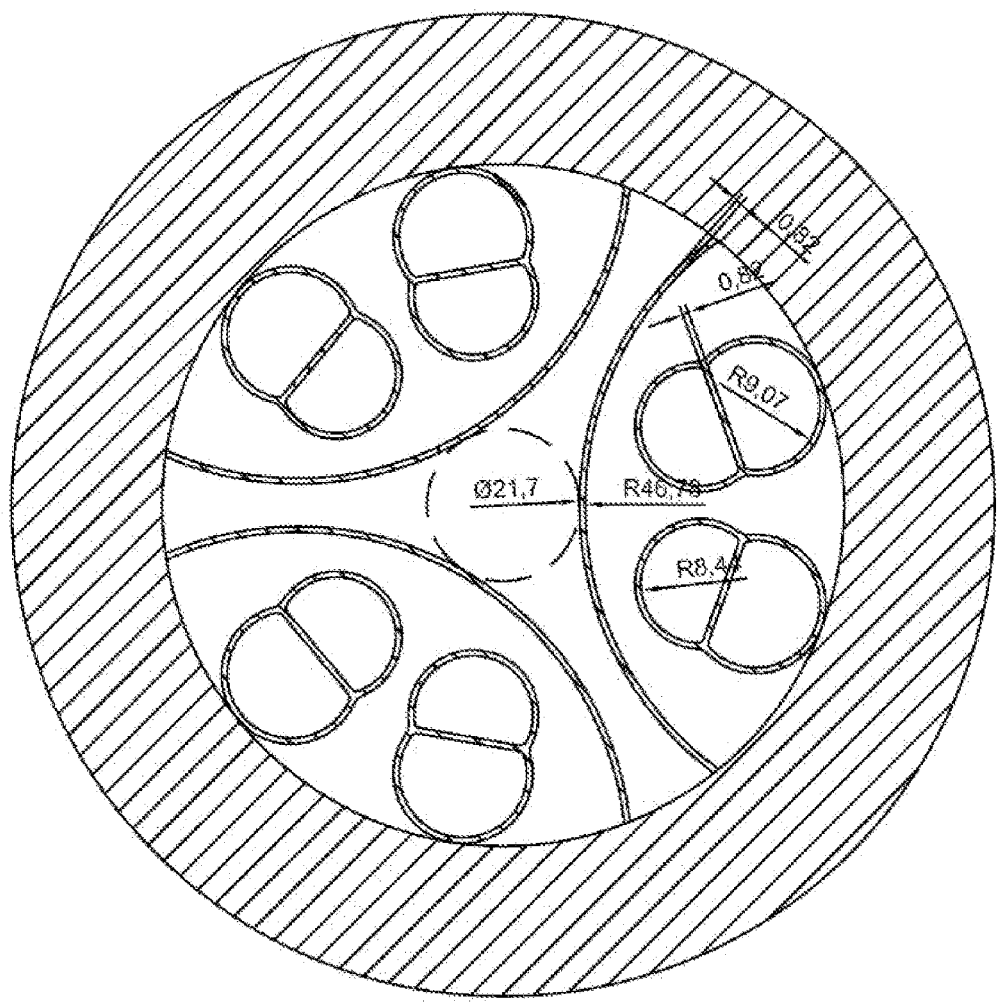
FIG. 5 is a structural diagram of an end surface/radial section of a low-loss hollow-core antiresonant fiber in one embodiment of the present disclosure.
Figure 6:
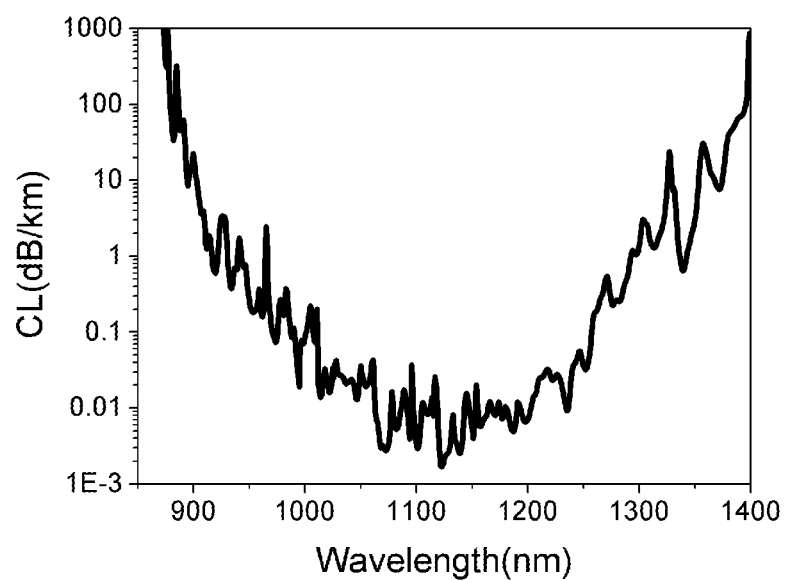
FIG. 6 is a loss curve of a low-loss hollow-core antiresonant fiber in one embodiment of the present disclosure.

Referring to FIG. 5 and FIG. 6, they show the situations of three closed cavities and their performance, which can realize the ultra-low loss less than 0.01 dB/km, and can realize the loss of 0.0017 dB/km at the wavelength of 1120 nm. In FIG. 5, the diameter of the fiber core is 21.7 µm, the radius of the first thin wall is 46.78 µm, and the wall thickness of the first thin wall is 0.82 µm. The end surfaces of the second thin walls are of annular thin-walled structures provided with thin-walled spacers, so the outermost layers of the second thin walls are equivalent to first walls, and the thin-walled spacers are equivalent to second walls. Specifically, for the second thin walls, the thickness of the thin-walled spacers is 0.82 µm, and the radius of part rings close to the inner surface of the outer layer structure is 9.07 µm. The part rings form the second thin walls together through the thin-walled spacers and the part rings which are closer to the fiber core, where the radius of the part rings closer to the fiber core is 8.44 µm.

The following FIG. 7 to FIG. 10 show structural diagrams of the end surface/radial section of the fiber in various embodiments, as described in the previous embodiments, the loss less than 0.1 dB/km can be realized by adjusting relevant parameters under these structures disclosed in the present disclosure.

Figure 7:
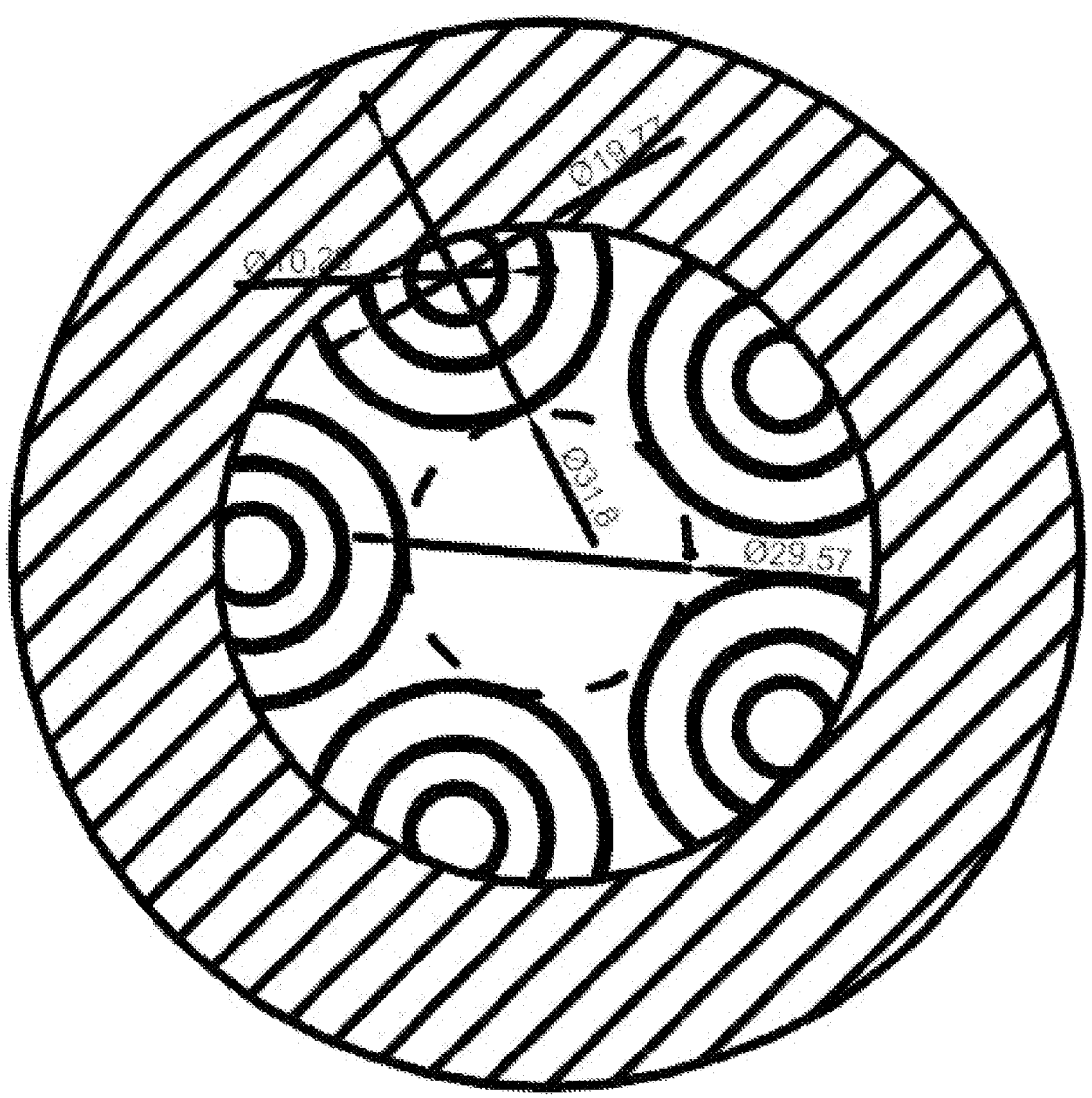
FIG. 7 is a structural diagram of an end surface/radial section of a low-loss hollow-core antiresonant fiber in one embodiment of the present disclosure.

Referring to FIG. 7, in another embodiment, when the radial section of the first thin wall is a fan shape with the second radius, the end surfaces of the second thin walls alternatively select concentric fan-shaped thin-walled structures with outward openings.

It should be noted that the radial, outward, inner, outer, and the like in the present disclosure are all relative to the axial direction of the fiber or the direction from the outside to the inside of the fiber. It can be understood that outward may also be understood as outward relative to the center of the fiber.

In terms of FIG. 7, it shows an example: the diameter of the fiber is 29.57 µm, the diameter of the first thin wall is 31.8 µm, the diameter of the part, closer to the fiber core, of the second thin wall is 19.77 µm, and the diameter of the part, close to the outer layer structure, of the second thin wall is 10.28 µm.

It should be noted that the plurality of concentric fan-shaped thin walls of the second thin walls are concentric, and FIG. 7 is an example of two concentric fan-shaped thin walls. In addition, when the first thin wall itself is a fan shape, the first thin wall may not be concentric with any fan-shaped thin wall of the second thin walls.

Figure 8:
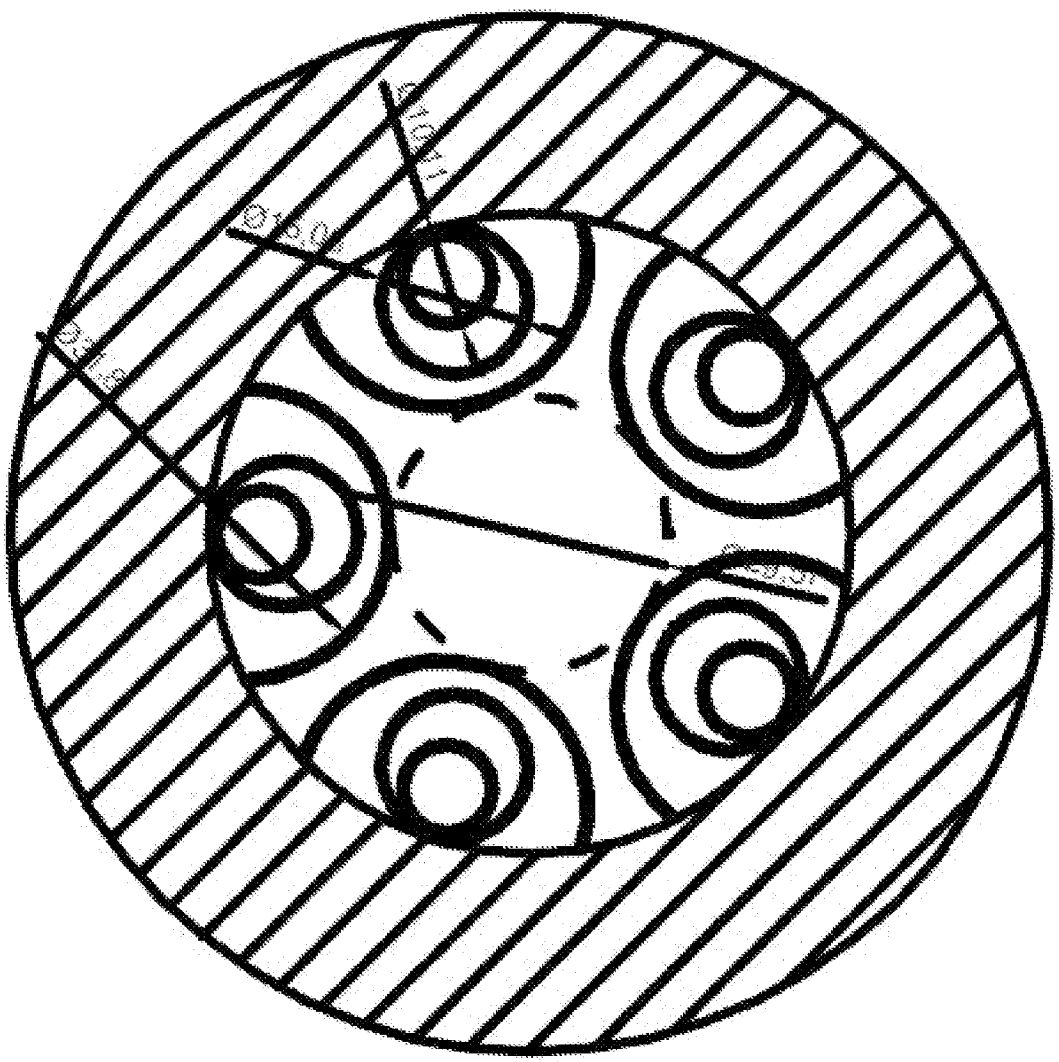
FIG. 8 is a structural diagram of an end surface/radial section of a low-loss hollow-core antiresonant fiber in one embodiment of the present disclosure.

Referring to FIG. 8, in another embodiment, when the radial section of the first thin wall is a fan shape with a second radius, the end surfaces of the second thin walls alternatively select nested casings.

It can be understood in combination with FIG. 8, the radial sections of the nested casings are two circles that are tangential to each other and are nested with each other. The diameter of the fiber core is 29.57 µm, the diameter of the first thin wall is 31.8 µm, the diameter of the part, closer to the fiber core, of the second thin wall is 10.11 µm, and the diameter of the part, close to the outer layer structure, of the second thin wall is 15.06 µm.

In another embodiment, when the radial section of the first thin wall is a fan shape with a second radius, the number of the second thin walls is two.

Preferably, when the radial section of the first thin wall is a fan shape with a second radius, the number of the second thin walls is two, and the end surfaces of the second thin walls substitutively select two annular thin-walled structures that are not in contact with each other.

Figure 9:
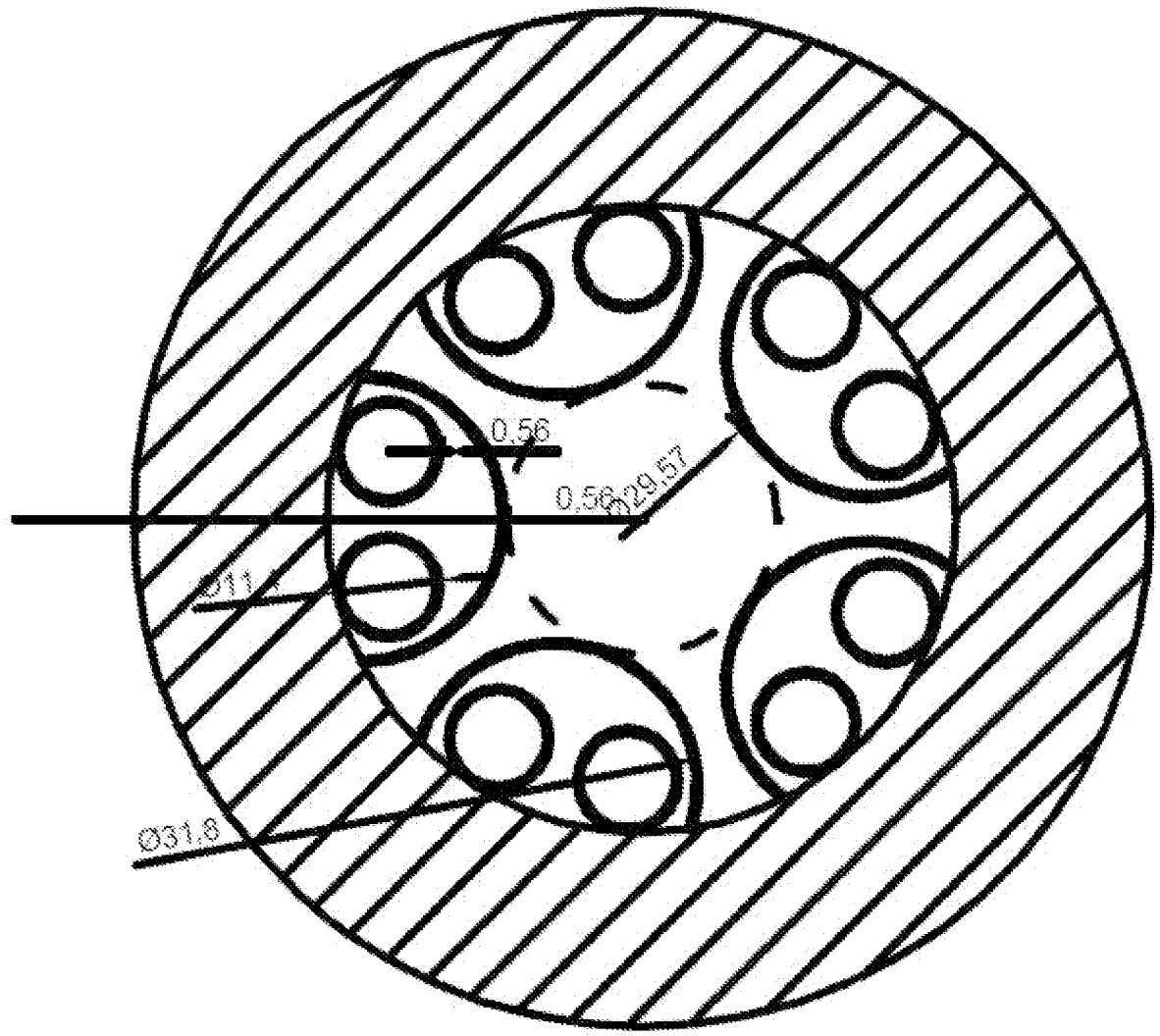
FIG. 9 is a structural diagram of an end surface/radial section of a low-loss hollow-core antiresonant fiber in one embodiment of the present disclosure.
Figure 10:
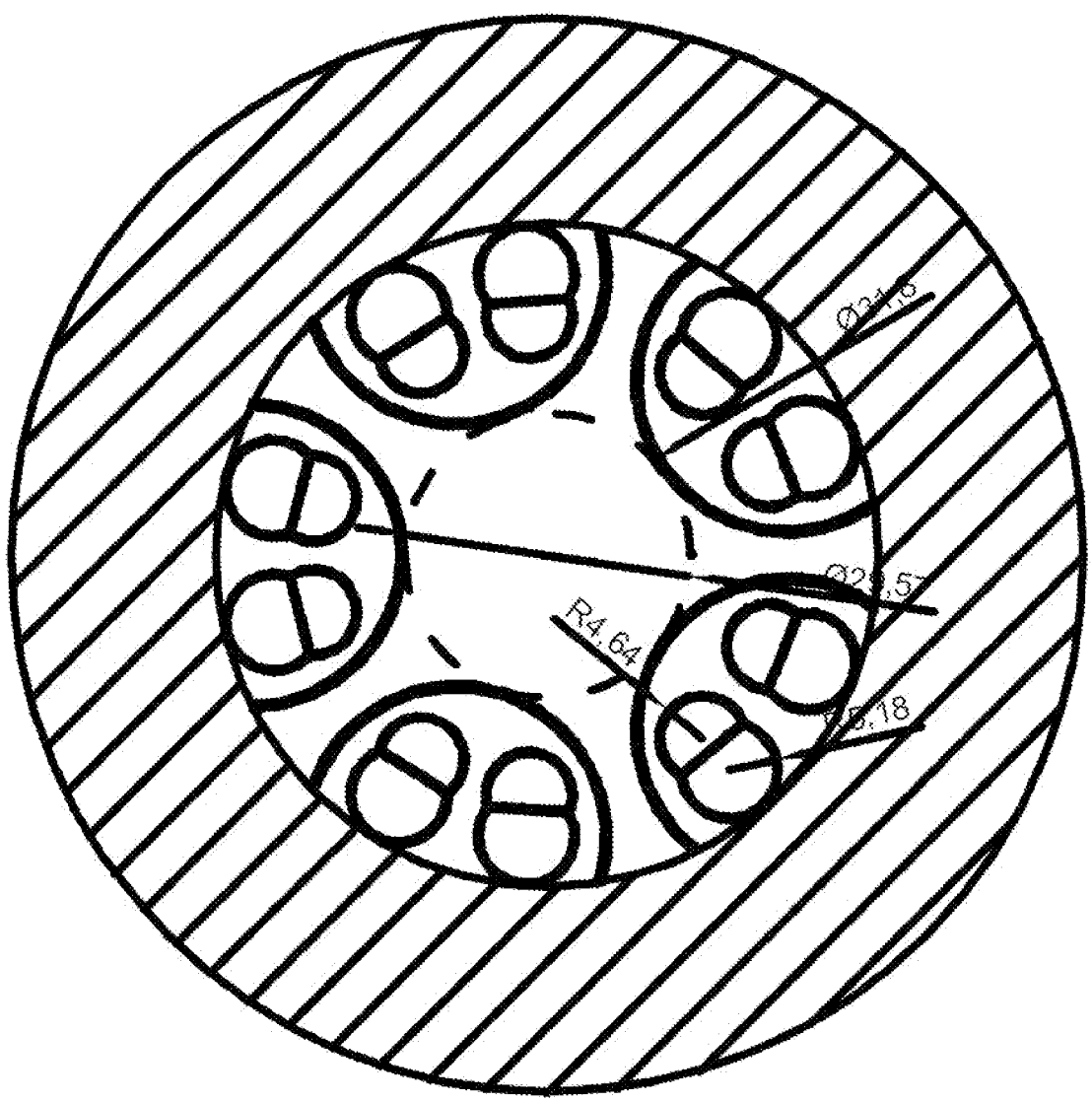
FIG. 10 is a structural diagram of an end surface/radial section of a low-loss hollow-core antiresonant fiber in one embodiment of the present disclosure.

In terms of different specific embodiments with two thin walls, referring to FIG. 9 and FIG. 10, FIG. 9 shows two annular thin walls that are spaced from one another, and FIG. 10 are two annular thin-walled structures that are spaced from one another and are provided with thin-walled spacers arranged in the centers of the end surfaces.

In FIG. 9 and FIG. 10, the diameters of the fiber cores are both 29.57 µm, and the diameters of the first thin walls are both 31.8 µm, where the diameter of the second thin walls in FIG. 9 is 11.4 µm. The second thin walls in FIG. 10: the end surfaces of the second thin walls are of annular thin-walled structures with spacers arranged in the centers, so the outermost layers of the second thin walls are equivalent to first walls, and the thin-walled spacers are equivalent to second walls. Specifically, for the second thin walls, the thickness of the thin-walled spacers is 0.5 µm, and the radius of part rings close to the inner surface of the outer layer structure is 5.18 µm. The part rings form the second thin walls together through the thin-walled spacers and the part rings which are closer to the fiber core, where the radius of the part rings closer to the fiber core is 4.64 µm.

It should be noted that, for the above embodiments with two second thin walls, the two thin walls are not in contact with each other.

In another embodiment, for any two of the plurality of the closed cavities, the wall thicknesses of the first thin walls of the two closed cavities are not equal.

For the present embodiment, the forgoing relevant schematic diagrams and its structures also disclose this situation. However, it should be noted that, the wall thicknesses may also be equal. Whether the wall thicknesses are equal or not will affect the performance of low loss to some extent, but it does not hinder the achievement of a low-loss hollow-core antiresonant fiber.

That is to say, for any two of the plurality of the closed cavities, the wall thicknesses of the first thin walls of the two closed cavities are equal.

In addition, in another embodiment, for any two closed cavities, the wall thicknesses of the second thin walls of the two closed cavities are equal.

In another embodiment, the second radius is greater than the radius of the fiber core of the fiber.

In another embodiment, the minimal radius of the concentric fan-shaped thin-walled structures is less than the radius of the fiber core of the fiber.

It should be noted that for the above-mentioned wall thickness, radius sizes, and the like, obviously, the bottom line principle of the hollow-core antiresonant fiber is to realize the antiresonance.

In addition, the wall thicknesses of all thin walls are as equal as possible, which helps to realize lower loss.

Furthermore, in the case that various wall thicknesses are equal, the arc radius and/or arc length corresponding to the first thin wall and the second thin wall can be further reduced, and meanwhile, the fiber core can be increased correspondingly. This can further reduce the loss of the fiber. Because of these and the forgoing parameter principles, there is no need to deliberately emphasize all parameters of each structural diagram in FIGS. 1, 3, 5, 6, 7, 8, 9 and 10 on the premise of meeting low loss. The ultra-low transmission loss less than the magnitude order of 1 dB/km, and even less than 0.1 dB/km, can be obtained by adjusting the parameters according to these principles disclosed by the present disclosure.

In additional embodiment, the shape and the number of layers can be adjusted according to requirements and a second preparation direction.

In conclusion, the fiber of the present disclosure is simple and reasonable in structure and can meet low transmission loss, for example, the loss less than 1 dB/km. In addition, the fiber structure of the present disclosure can further realize ultra-low transmission loss, for example, referring to forgoing description, the ultra-low transmission loss less than 1 dB/km, and even less than 0.1 dB/km can be reached.

The above descriptions are merely embodiments of the present disclosure, but are not intended to limit the present disclosure. For those skilled in the art, the present disclosure may have various modifications and variations. Any modification, equivalent replacement, improvement or the like made within the spirit and principle of the present disclosure shall fall within the scope of protection of the present disclosure.

What is claimed is:

1. A low-loss hollow-core antiresonant fiber, comprising:
in the radial direction from the outside to the inside of the fiber, an outer layer structure, and a hollow-core area and a plurality of closed cavities, except for the hollow-core area, with the same structure located in the inner space surrounded by the inner surface of the outer layer structure, wherein the radial section of the inner surface of the outer layer structure is a circle with a first radius;

in the circumferential direction of the inner surface of the outer layer structure, the plurality of the closed cavities are spaced from one another and are distributed uniformly and circumferentially;

each closed cavity comprises: an outermost wall serving as a first thin wall, and the radial section of the outermost wall is a fan shape or a circle with a second radius;

each closed cavity further comprises: second thin walls located in the inner space surrounded by the inner surface of the outermost wall, and the end surfaces of the second thin walls are annular thin-walled structures with thin-walled spacers arranged in the centers.

2. The fiber according to claim 1, wherein preferably, when the radial section of the first thin wall is a fan shape with a second radius, the end surfaces of the second thin walls alternatively select concentric and fan-shaped thin-walled structures with outward openings.

3. The fiber according to claim 1, wherein when the radial section of the first thin wall is a fan shape with a second radius, the end surfaces of the second thin walls alternatively select nested casings.

4. The optical cable according to claim 1, wherein when the radial section of the first thin wall is a fan shape with a second radius, the number of the second thin walls is two.

5. The fiber according to claim 1, wherein when the radial section of the first thin wall is a fan shape with a second radius, the number of the second thin walls is two, and the end surfaces of the second thin walls alternatively select two annular thin-walled structures that are not in contact with each other.

6. The fiber according to claim 1, wherein for any two of the plurality of the closed cavities, the wall thicknesses of the first thin walls of the two closed cavities are not equal.

7. The optical cable according to claim 1, wherein for any two of the plurality of the closed cavities, the wall thicknesses of the first thin walls of the two closed cavities are equal.

8. The fiber according to claim 1, wherein for any two of the plurality of the closed cavities, the wall thicknesses of the second thin walls of the two closed cavities are equal.

9. The fiber according to claim 1, wherein the second radius is greater than the radius of the fiber core of the fiber.

10. The fiber according to claim 2, wherein the minimal radius of the concentric fan-shaped thin-walled structures is less than the radius of the fiber core of the fiber.

* * * * *